US011149667B1

(12) United States Patent
Jenks et al.

(10) Patent No.: US 11,149,667 B1
(45) Date of Patent: Oct. 19, 2021

(54) SEQUENTIAL TURBOCHARGER DIAGNOSTIC SYSTEM AND METHOD

(71) Applicant: Caterpillar Inc., Peoria, IL (US)

(72) Inventors: Julia H. Jenks, Edwards, IL (US); Karthik Jayasankaran, Dunlap, IL (US); Shivangi Wagle, Peoria, IL (US); Kevin Sergott, Dunlap, IL (US); Kosha B. Patel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/016,895

(22) Filed: Sep. 10, 2020

(51) Int. Cl.
| | |
|---|---|
| *F02D 41/00* | (2006.01) |
| *F02B 37/12* | (2006.01) |
| *F02D 41/22* | (2006.01) |
| *F02B 37/00* | (2006.01) |

(52) U.S. Cl.
CPC .......... *F02D 41/0007* (2013.01); *F02B 37/12* (2013.01); *F02D 41/22* (2013.01); *F02D 41/221* (2013.01); *F02B 37/001* (2013.01)

(58) Field of Classification Search
CPC .... F02D 41/0007; F02D 41/221; F02D 41/22; F02B 37/12; F02B 37/001
See application file for complete search history.

(56) References Cited

U.S. PATENT DOCUMENTS

| | | | |
|---|---|---|---|
| 6,298,718 B1 | 10/2001 | Wang | |
| 9,466,152 B2 | 10/2016 | Grosse-Laxzen et al. | |
| 9,482,172 B2 | 11/2016 | Pursifull et al. | |
| 9,612,174 B2 | 4/2017 | Peters et al. | |
| 10,012,169 B2 | 7/2018 | Rueger et al. | |
| 2009/0077965 A1* | 3/2009 | Pursifull | F02B 39/16 60/602 |

FOREIGN PATENT DOCUMENTS

EP    2126539 B1    8/2017

* cited by examiner

*Primary Examiner* — Audrey B. Walter
*Assistant Examiner* — Edward Bushard
(74) *Attorney, Agent, or Firm* — Leydig, Voit & Mayer, Ltd.

(57) ABSTRACT

An internal combustion engine includes an inline turbocharger and at least a first inline turbocharger that has a first turbine air valve, and a first inline compressor that has a first compressor air valve. A control valve is responsive to commands from an electronic controller to move the air valves between open and closed positions. The electronic controller monitors operating parameters of the engine to diagnose a fault. determine whether an air valve is stuck open or closed, and adjust a priority schedule for activating or deactivating the first inline turbocharger based on the type of fault.

20 Claims, 5 Drawing Sheets

SEQUENTIAL TURBOCHARGER DIAGNOSTIC SYSTEM AND METHOD

BACKGROUND

In various applications, including in marine applications, hybrid electrical or mechanical combustion engine systems are used to provide motive and/or electrical motive power to marine vessels. The engines used in these applications, whether used to drive electrical power generators, mechanical propeller shafts, or combinations of power generation methods, typically operate at various operating points for prolonged times without changes, which differs from engine operation in other applications, for example, in on-highway or off-highway vehicles. For this reason, marine engines such as diesel or gas engines, include air systems that are sized to operate both at low loads for prolonged periods, or at high loads for prolonged periods. In some engines, this is accomplished by implementing an inline turbocharger arrangement, which provides acceptable transient response when the engine transitions from a low power output to a high output, and vice versa.

In certain applications, inline turbocharger arrangements include two or more turbochargers that include respective turbines and compressors connected in parallel circuit configuration to receive exhaust gas from the engine and provide compressed air to the engine cylinders during operation. To accommodate different operating engine conditions, valves are used to fluidly connect or disconnect one or more turbines and one or more compressors from the engine fluid circuits. At times, malfunctions in those valves can cause the valves to stick open or closed, which can affect engine operation.

In the past, various solutions have been proposed for diagnosing failures of exhaust gas or intake air valves operating to connect or disconnect a turbocharger from the engine. One such solution can be found in U.S. Pat. No. 6,298,718B1 (Wang), which describes a system and method for detecting abnormal operation of a turbocharger compressor. Wang describes a system that reads data from a plurality of sensors and conducts a series of rationality tests on the sensor data to determine whether the sensors are operating normally and whether the data indicates proper performance of turbo machinery. When a failure is detected, Wang describes generating a message and attempting to mitigate the failure by de-rating the engine power or speed.

While a solution such as proposed by Wang can effectively diagnose a failure, de-rating the engine is not always a desirable solution, especially for marine applications. Further, notification of a failure does not attempt to address the failure itself unless engine service corrects the failure.

BRIEF SUMMARY OF THE DISCLOSURE

In one aspect, the present disclosure describes an internal combustion engine. The internal combustion engine includes a cylinder case that includes a plurality of cylinders, the plurality of cylinders associated with an intake system and an exhaust system, wherein during operation, each of the plurality of cylinders receives an intake charge from the intake system and expels exhaust gas to the exhaust system. The internal combustion engine further includes an inline turbocharger including a turbine connected directly to the exhaust system and a compressor connected directly to the intake system; a first inline turbocharger including: a first inline turbine connected to the exhaust system; a first turbine air valve disposed to block a flow of exhaust gas from the exhaust system through the first inline turbine; a first inline compressor connected to the intake system; a first compressor air valve disposed to block a flow of intake charge to the intake system from the first inline compressor; and a control valve associated with the first inline turbine and compressor air valves, the control valve being responsive to a first command from an electronic controller to effect a move for each of the first inline turbine and compressor air valves between respective open and closed positions.

In one embodiment, the electronic controller is programmed and operates to: monitor a plurality of operating parameters of the internal combustion engine; diagnose a fault in the first inline turbine or compressor air valve; determine whether the fault is a stuck open or a stuck closed valve; adjust a priority schedule for activating or deactivating the first inline turbocharger based on the determination of whether the fault is a stuck open or a stuck closed valve; determine whether the fault has been healed; and readjust the priority schedule when the fault has been healed.

In another aspect, the disclosure describes a method for operating an engine. The method includes providing an electronic controller associated with the engine, the electronic controller disposed to receive information from a plurality of sensors disposed on the engine, the engine including first and second inline turbochargers, each having an inline turbine with a turbine air valve, an inline compressor with a compressor air valve, and a control valve that is responsive to a command from an electronic controller to effect a move for each of the turbine and compressor air valves between respective open and closed positions. The method further includes diagnosing a faulting valve in one of the turbine or compressor valves in the first or second inline turbocharger based on the information received in the electronic controller from the plurality of sensors; commanding the faulting valve to activate; determining whether the faulting valve has activated successfully and, while the faulting valve has not activated successfully, continuing to command the faulting valve to activate by re-prioritizing the first or second inline turbocharger having the faulting valve to operate out of turn.

In yet another aspect, the disclosure describes a diagnostic system for a turbocharger arrangement on an engine, the engine including a first inline turbocharger having a first inline turbine connected to the exhaust system; a first turbine air valve disposed to block a flow of exhaust gas from the exhaust system through the first inline turbine; a first inline compressor connected to the intake system; a first compressor air valve disposed to block a flow of intake charge to the intake system from the first inline compressor; and a control valve associated with the first inline turbine and compressor air valves, the control valve being responsive to a first command from an electronic controller to effect a move for each of the first inline turbine and compressor air valves between respective open and closed positions. The engine further includes a second inline turbocharger having a second inline turbine connected to the exhaust system; a second turbine air valve disposed to block a flow of exhaust gas from the exhaust system through the second inline turbine; a second inline compressor connected to the intake system; a second compressor air valve disposed to block a flow of intake charge to the intake system from the second inline compressor; and a second control valve associated with the second inline turbine and compressor air valves, the second control valve being responsive to a second command from an electronic controller to effect a move for each of the second inline turbine and compressor air valves between respective open and closed positions.

In one embodiment, the electronic controller is programmed and operates to: monitor a plurality of operating parameters of the internal combustion engine; diagnose a fault in the first or second inline turbine or compressor air valve; determine whether the fault is a stuck open or a stuck closed valve; adjust a priority schedule for activating or deactivating the first or second inline turbocharger based on the determination of where a faulting valve is located and whether the fault is a stuck open or a stuck closed valve; determine whether the faulting valve has been healed; and readjust the priority schedule when the faulting valve has been healed.

BRIEF DESCRIPTION OF THE SEVERAL VIEWS OF THE DRAWING(S)

DETAILED DESCRIPTION

The present disclosure is directed to a system and method for diagnosing and mitigating valve failures in inline turbocharger systems for use on internal combustion engines. In the described, exemplary embodiment, the engine is a diesel or gas engine operating in a marine application, but it should be appreciated that the systems and methods described herein are applicable to other engine types and applications, including land-based, stationary, and mobile vehicle or machine applications.

Figure 1:
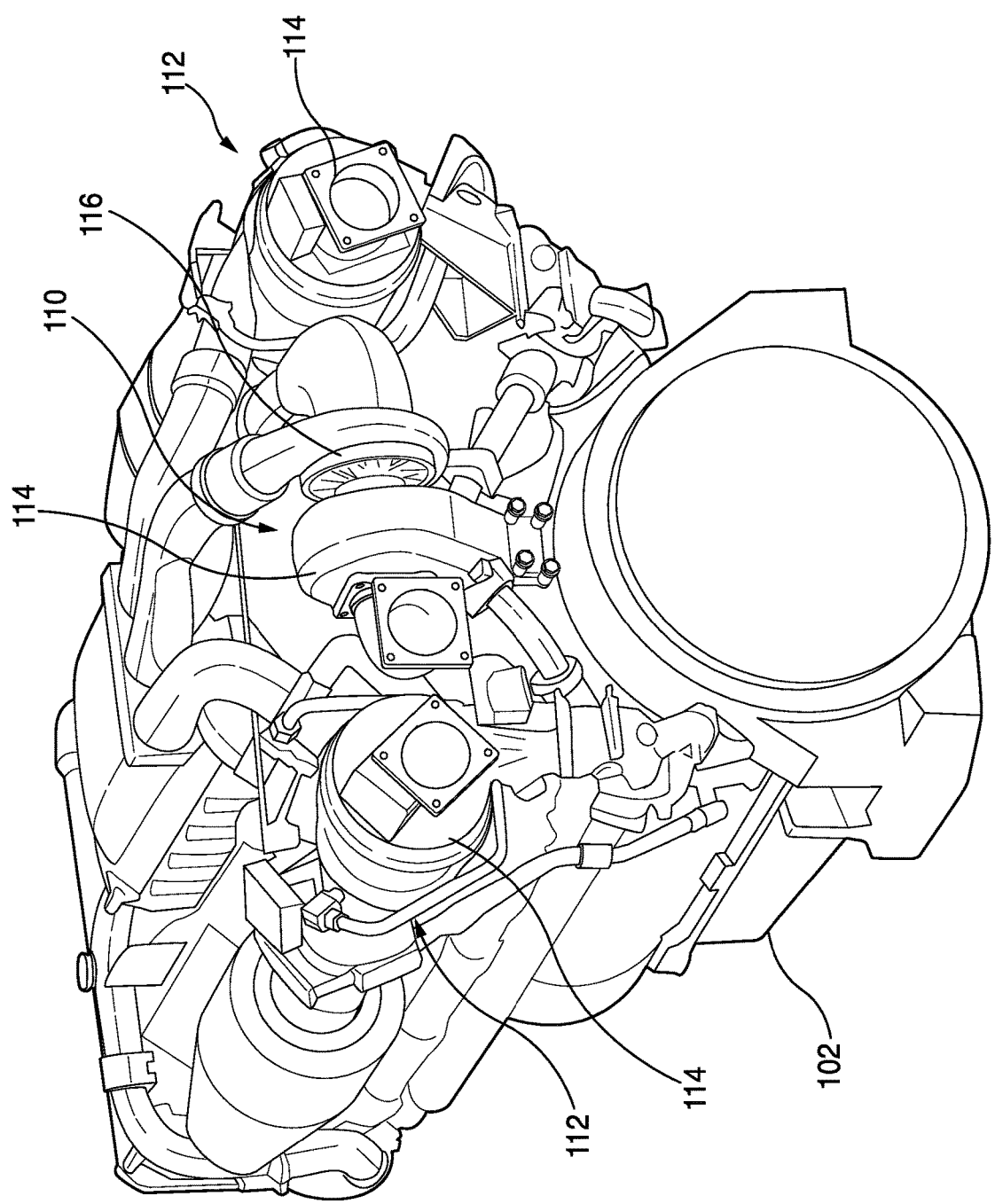
FIG. 1 is an outline view of an engine in accordance with the disclosure.
Figure 2:
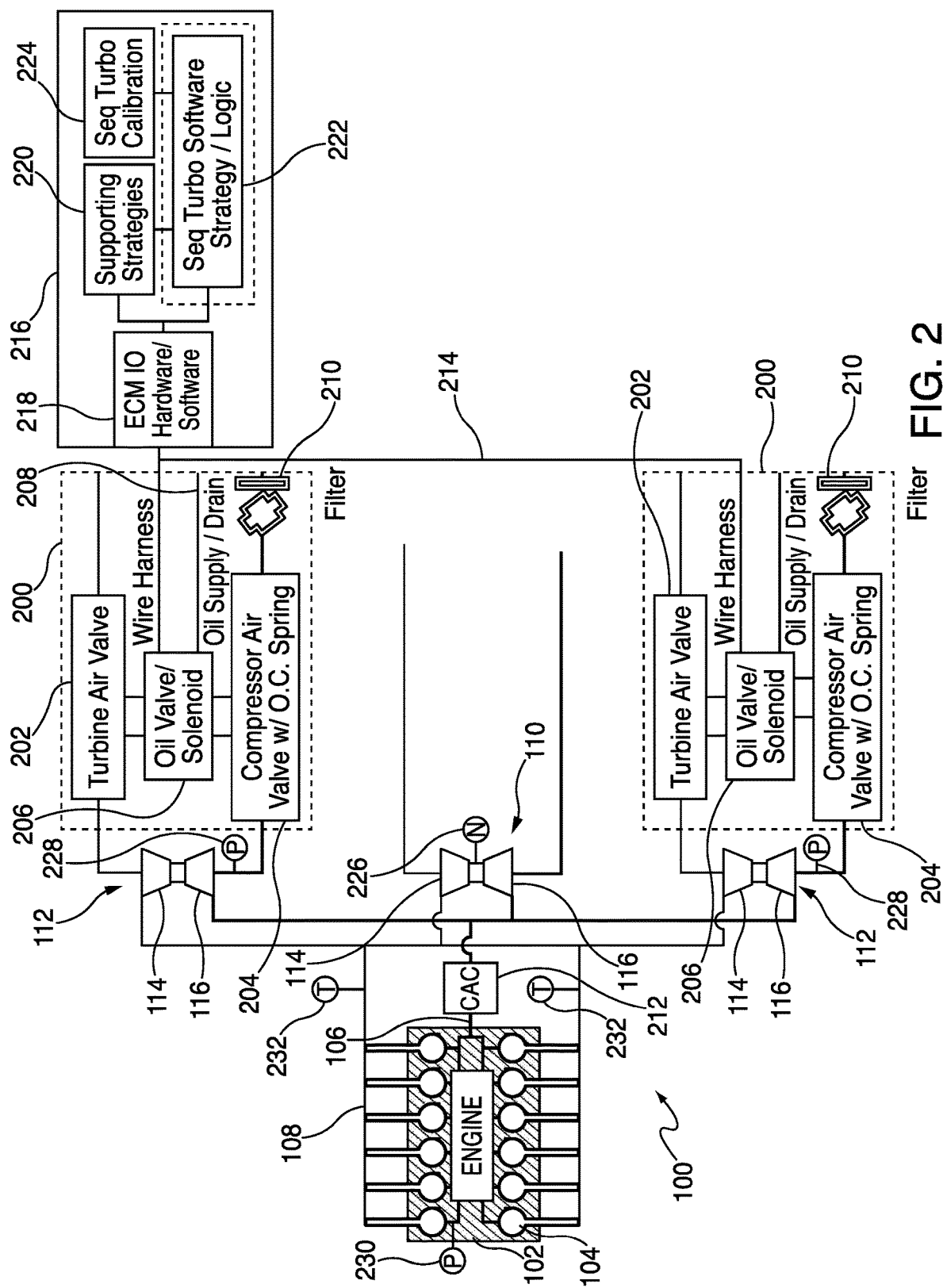
FIG. 2 is an engine air system and control schematic in accordance with the disclosure.

An outline view of an engine 100 is shown in FIG. 1, and a schematic view including some components and systems of the engine 100 is shown in FIG. 2. In reference to these figures, the engine 100 includes a cylinder case 102 that includes a plurality of cylinders 104, in the known fashion. The cylinders 104 receive air from an intake air system 106 and expel exhaust into an exhaust system 108. Connected to the intake air and exhaust systems 106 and 108 are an inline turbocharger 110 and two inline turbochargers 112. Each of the turbochargers 110 and 112 includes a turbine 114 connected to the exhaust system 108 and a compressor 116 connected to the intake air system 106. It should be appreciated that, although the turbines 114 and compressors 116 are described together, fewer than all or all may be different sizes and types of devices depending on the requirements of each particular application. Moreover, other components and systems such as exhaust gas recirculation (EGR), compressor and/or turbine bypasses, intercoolers etc. are not shown for simplicity but can be incorporated into an engine without departing or detracting from the present disclosure.

In the embodiment shown in FIG. 2, the turbine 114 of the inline turbocharger 110 is directly connected to the exhaust system 106, and the respective compressor 116 is directly connected to the intake air system 106. The inline turbochargers 112 are selectively isolated from the engine 100 through valve systems 200, shown in FIG. 2. More specifically, each valve system 200 includes a turbine air valve 202 that is disposed at an outlet of a respective turbine 114 of each inline turbocharger 112, and a compressor air valve 204 that is disposed at an inlet of a respective compressor 116 of each inline turbocharger 112. The turbine and compressor air valves 202 and 204 are operated selectively by an actuator 206, which is embodied here as a control valve 206. The turbine and compressor air valves 202 and 204 may be embodied as any appropriate valve type such as gate or plate valves.

In the illustrated embodiment, the control valve 206 is a solenoid operated oil valve that operates the turbine and compressor air valves 202 and 204 in one of the inline turbochargers 112. As shown, the control valve 206 is configured to and operates to simultaneously close both the turbine and compressor air valves 202 and 204, for example, when the inline turbocharger 112 is deactivated, and open at least the turbine air valve 202, for example, when the inline turbocharger 112 is activated. In this case, the compressor air valve 204 may be arranged to open when sufficient pressure difference exists across it as the compressor begins to operate following opening of the turbine air valve 202. Oil to operate the control valve 206 is provided by an engine oil circuit 208 in the known fashion.

Whether the control valves 206 operate to maintain the turbine and compressor air valves 202 and 204 open or closed depends on the engine operating state such that operation at a low range may keep both inline turbochargers 112 deactivated (i.e. with the valves 202 and 204 deactivated or closed), such that the inline turbocharger 110 is operating, operation in a mid-range may active one of the two inline turbochargers 112, and operation at a high range may activate both inline turbochargers 112, but other control arrangements can also be used. Alternatively, more than two inline turbochargers 112 may be used, each having a set of air valves as those already described and be connected in parallel with the inline turbochargers 112 shown. In some embodiments, a single inline turbocharger 112 may be used, along with the inline turbocharger 110, to operate the engine over its entire operating range, and the second inline turbocharger may be used for fail-over or redundancy in the event of a turbocharger failure.

During engine operation, exhaust gas present in the exhaust system passes through the turbine 114 of the inline turbocharger 110 and from neither, one, or both turbines 114 of the inline turbochargers 112 depending on the position or operating state of the respective control valves 206, which in turn depends on the operating state of the engine 100, as previously described. In this way, exhaust gas from each of the cylinders 104 is collected in the exhaust system 108, and from there passes through one or more turbines 114, which generate power to operate their respective one or more compressors 116. For the compressors, air may first pass through air filters 210 and then be cooled at a charge air cooler (CAC) 212 before being provided to the cylinders 104. A wire harness 214 may transmit or provide instructions and power to operate the control valves 206 during operation. These instructions may be generated by an electronic controller 216.

The electronic controller 216, or electronic control module (ECM), may be a single controller or may include more than one controller disposed to control various functions and/or features of a machine. For example, a master controller, used to control the overall operation and function of the machine, may be cooperatively implemented with a motor or engine controller, used to control the engine 100. In this embodiment, the term "controller" is meant to include one, two, or more controllers that may be associated with the machine in which the engine 100 may be installed in, and that may cooperate in controlling various functions and operations. The functionality of the controller 216, while described and shown conceptually in the present disclosure to include various discrete functions for illustrative purposes only, may be implemented in hardware and/or software without regard to the discrete functionality shown. Accordingly, various interfaces of the controller are described relative to components of the engine shown in the block diagram of FIG. 2, but such interfaces are not intended to limit the type and number of components that are connected, nor the number of controllers that are described.

The electronic controller 216 includes various sub-systems or modules such as an input and output (I/O) device 218, which is configured in software and/or hardware and operates to provide and receive information and power signals between various sensors and actuators of the engine 100 such as exhaust and intake charge pressure and temperature, pressure before and/or after the compressors and/or turbines, engine speed and load, and others. The I/O device 218 operatively communicates with various supporting strategies 220, which can include filters, diagnostic routines, service timers and reminders, and the like. The supporting strategies 220 are operatively connected to various other control modules within the electronic controller 216, including an inline turbocharger control strategy module or control module 222. The control module 222 may be one of numerous other control modules used to control various engine systems such as the fuel injectors, EGR system components and the like. Such other modules are not shown herein for simplicity. The control module 222 may further include a backup module 224, which can be populated with information regarding the various operating states of the engine 100, which are correlated with various operating positions of the control valves 206. The control module 222 may also include functionality for detecting failures in the control valve 206, or sticking of the turbine and/or compressor air valves 202 and 204, and control logic or strategy for mitigating any such failures as they appear, as described below.

Information about the operating state of the engine 100 and, particularly, the operating state of the turbines 114, compressors 116, the various air valves 202 and 204, and the like, is provided to the electronic controller 216 from various sensors placed on the engine 100 and communicating with the electronic controller 216 via the harness 214 (some connections not shown for simplicity). In the illustrated embodiment of FIG. 2, the engine includes a shaft speed sensor 226 that is associated with the inline turbocharger 110. The shaft speed sensor 226 provides a signal indicative of a speed of rotation of the shaft of the inline turbocharger 110 to the electronic controller 216. Additional shaft speed sensors can also be used for the inline turbochargers 112 (not shown).

The engine 100 further includes two air pressure sensors 228 disposed, one each, at the inlet of each compressor 116 of the inline turbochargers 112. The air pressure sensors 228 provide a signal indicative of an air pressure at the inlet of each compressor 116 to the electronic controller 216, which the electronic controller 216 may process and use to determine whether each compressor is operating. For example, when a compressor is operating, a pressure at the inlet of the compressor may be negative or below atmospheric pressure, especially in the presence of an inlet restriction such as an air filter, for example, the air filter 210 (FIG. 2). One or more intake charge air sensors 230 is connected to the intake system 106 of the engine 100 at a location close to where intake charge is provided to the cylinders 104, and provides a signal to the electronic controller 216 that is indicative of the fluid pressure of the intake charge that enters the cylinders 104. The engine further includes one or more exhaust temperature sensors 232 disposed at the engine exhaust system 108 upstream of the inline turbines 114 and configured to provide signals to the electronic controller 216 that are indicative of exhaust temperature at those locations during engine operation.

In one embodiment, the compressor inlet pressure sensors 228 are positioned between the inlet of the compressor 116 and the compressor air valve 204 on both inline turbochargers 112. In the engine 100 shown in FIG. 2, two inline turbochargers 112 are used and thus two sensors 228 are utilized. These sensors, along with the turbocharger speed sensor 226 on the inline turbocharger 110, may be used for failure diagnostics. In the illustrated embodiment, the turbine air valves 202 may be actuated to open and close by the control valve 206 based on commands from the electronic controller 216, and the compressor air valves 204 may be pulled open by a vacuum actuated valve (not shown) and allowed to close or be actuated to close by the control valve 206 based on commands from the electronic controller 216, but other configurations and arrangements for opening and closing the air valves 202 and/or 204 may be used.

When the engine is operating, the electronic controller 216 operates to control turbocharger operation and engine operation, for example, in terms of engine speed and load, in a coordinated fashion. For example, when a fault is detected at one of the air control valves 202 or 204, i.e., when expected presence of air flow past an open valve, or an expected absence of airflow is not detected past a closed valve, the turbine speed indicated by sensor 226 of the inline turbocharger 110 may be controlled in a closed loop fashion to thus achieve an engine reduction in power or de-rate when the normal number and capacity of turbocharging is not available to the engine due to the failure in an air control valve.

Figure 3:
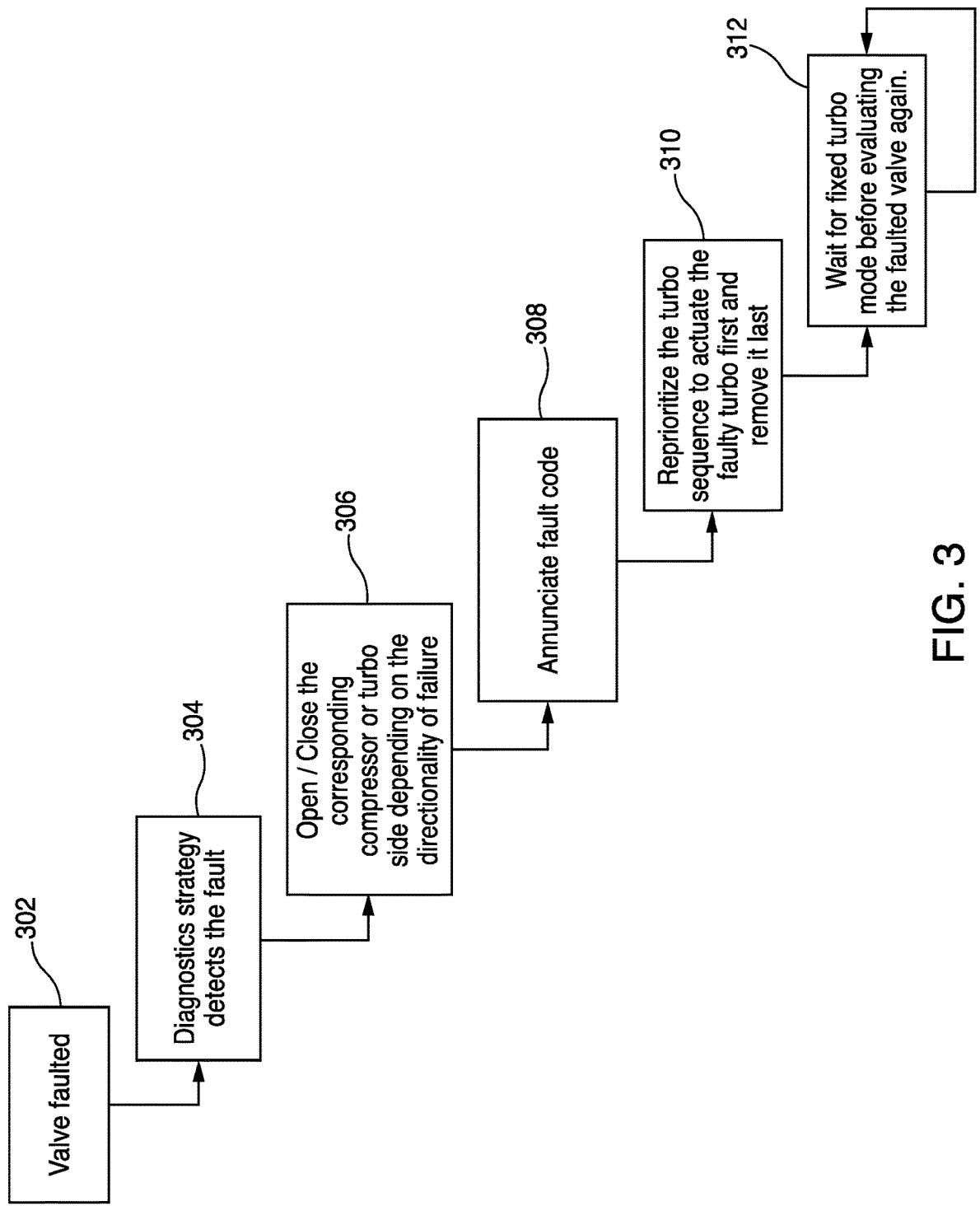
FIGS. 3 and 4 are flowcharts for methods in accordance with the disclosure.

A flowchart for a method of operating the engine 100 in the presence of fault in one of the valves 202 or 204 is shown in FIG. 3. In accordance with the method, a valve fault occurs at 302, and a diagnostic strategy operating within the electronic controller detects the fault at 304. Fault detection may be carried out based on signals from the various sensors. For example, when an inline turbocharger 112 is inactive and is commanded to activate, the electronic controller 216 may send a signal to the control valve 206 to open the turbine and compressor air valves 202 and 204. Following the opening command, the electronic controller 216 may monitor the sensor inputs to evaluate whether pressures, and pressure differences, are at the expected levels when the newly activated inline turbocharger is operating normally. For example, when an inline turbocharger is commanded to activate, the controller expects that the turbine will begin operating, which will also cause the compressor to operate. Operation of the compressor can be sensed by monitoring for a drop in compressor inlet pressure.

To accomplish this, the controller may also calculate and compare a pressure difference between the air pressure at the compressor inlet, provided by sensor 228, with the air pressure at the intake system, provided by sensor 230. This pressure difference will be different depending on whether the turbine and compressor air valves opened as expected, and also whether one or the other has stuck closed, indicating a failure. A similar determination is also made when the inline turbocharger is active and commanded to inactivate, in which case the electronic controller command is to close the turbine and compressor air valves 202 and 204. In this case, the controller may monitor the compressor inlet pressure, expecting a rise to atmospheric pressure.

In one embodiment, the diagnostic determination can additionally, or alternatively, include a more deliberate diagnostic routine. For example, the routine may monitor engine parameters following a command to open or close an inline turbocharger set of air valves when either one of the valves of the inline turbocharger has failed open or close respectively to protect hardware. For example, a valve that has stuck open will remain commanded open as long as possible, and then the valve will be commanded closed to determine whether a faulting condition has changed and the valve begins to operate. After failing the first attempt to open or close, the next turbocharger can be sequenced depending on the failure. Every time engine operation returns to operation with only the central turbocharger, the failed inline turbocharger is always selected as the first to sequence in when engine is loaded up, and a fault code is provided after the first failed attempt to do so, or any subsequent attempts, which indicates that the valve fault is still present. While the fault persists, addition annunciations may be provided. Moreover, an additional annunciation of the fault may also be provided each time engine operation will return to operation with only the central turbocharger.

Consequently, the determination of failure at 304 may result in a determination as to the operating state of each turbine air valve 202 and each compressor air valve 204. The operating state of each valve may either be determined to be normal, or a particular one or more valves may be determined to have stuck open, stuck closed, or stuck in an intermediate position. In other words, for the embodiment shown in FIG. 2, which includes a total of four air valves (two turbine air valves 202 and two compressor air valves 204 on the two inline turbochargers 112), there are sixteen total determinations, four for each valve: (1) valve is operating normally, (2) valve is stuck open, (3) valve is stuck closed, and (4) valve is stuck at an intermediate position between open and closed.

When a valve is determined to have stuck, the controller 216 may send a command to open a stuck closed valve, close a stuck open valve, or move a valve stuck in an intermediate position at 306 in an attempt to cause the valve to become unstuck. Depending on conditions, sticking of valves may be temporary and caused by, for example, soot or unburnt fuel buildup, ice, and the like, such that a command may cause the valve to unstick. If after the valve cycling the valve remains stuck, the controller annunciates a fault code at 308, for example, by providing an indication to the engine operator and activating a fault code internally in the controller.

While a valve fault code remains active, the controller may select the inline turbocharger that has the stuck valve to activate first or deactivate last at 310, when engine operating conditions require activation (or deactivation) of one of the two inline turbochargers. This attempt augments the mitigation attempt at 306 to force the valves to become unstuck by either forcing the valves to open when the turbocharger is being activated or allowing the working fluid to pass over and heat the stuck valve longer, when the valves are stuck open. This process continues at 312 while the stuck valve condition is present.

To accomplish activation or deactivation of a failed inline turbocharger out of order, the electronic controller essentially changes the inline turbo priority during engine operation. For illustration, when all the air valves in the inline turbochargers are operating normally, a prioritization of the activation and deactivation of each inline turbocharger relative to the others is done by following a priority schedule. This priority schedule is adjusted in the event of a valve failure. Under normal circumstances, when no failure is present, the priority schedule includes a timer that runs while each inline turbocharger is operating. The timer begins when the inline turbocharger is commanded to activate, and stops when the inline turbocharger is commanded to deactivate, such that an operating time for each inline turbocharger is maintained and updated during engine operation. The inline turbochargers with the lowest time are selected to be activated first and deactivated last, and the inline turbochargers with the highest time are selected to be activated last and deactivated first (i.e. lowest time is first in, highest time is first out).

This priority schedule is adjusted at 310 when a valve is determined to be stuck. More specifically, when a valve is stuck open, the inline turbocharger having the failed valve is re-prioritized regardless of run time to be activated first and, thus, try to force the valve in the opening direction (this is also the case for a valve stuck in an intermediate position between open and closed). The timer for that inline turbocharger is thus forced to assume a value that will ensure its activation, such as 1, until the valve becomes unstuck and the inline turbocharger is determined to have healed, i.e., the fault has been corrected. The run time for the turbocharger keeps accumulating in the background, while the timer is forced to assume the value of 1, until the turbocharger is healed, at which time prioritization based on the timer returns to normal.

In instances where a valve is stuck closed, the inline turbocharger with the failed valve is forced to deactivate (i.e. close the valves). To achieve this deactivation, the timer for that inline turbocharger is forced to assume a value that will ensure its deactivation, such as −1, and the timer will remain frozen in the background with the previously accumulated run time until the valve becomes unstuck, or is healed, at which time the timer will resume its normal role in prioritization of the turbocharger using the previously accumulated run time for the particular inline turbocharger.

Failures in the inline turbochargers need not be limited to stuck valves, and can include other failure modes while conducting a test. For example, depending on the sensor signals provided to the electronic controller, the controller may determine that a spool valve in the control valve 206 (FIG. 2) has failed, or that there is a failure in the wiring harness 214, in addition to particular valve failures. Such additional failure modes may not be correctable by re-prioritizing inline turbocharger operation, in which case an inline turbocharger that is related to the failure is taken out of service until a service test is conducted, any repair operation can be performed as necessary, and then the service test is repeated to indicate that no failures are present.

Figure 4:
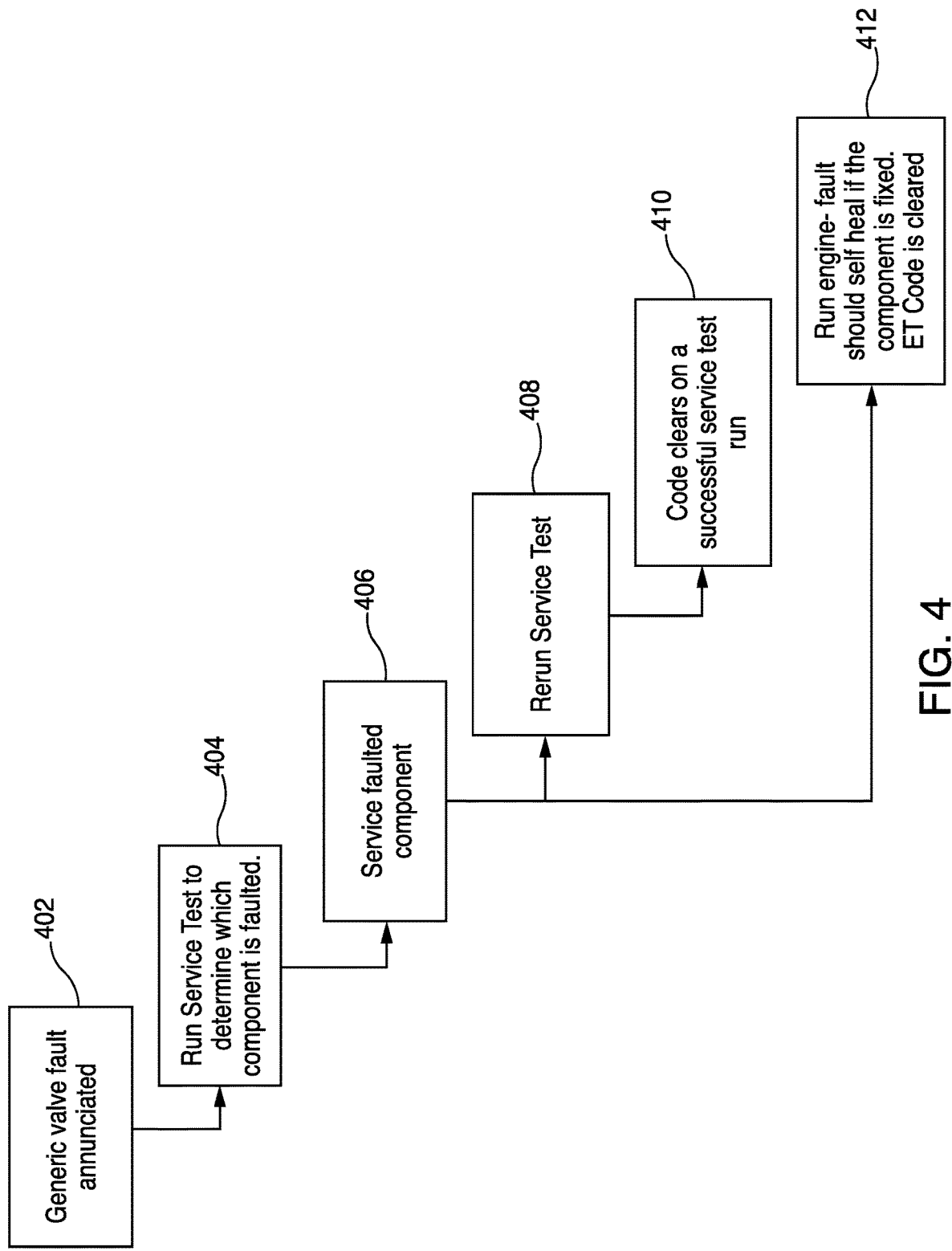

A flowchart for a method of determining failures in various components is shown in FIG. 4. Here, a generic fault code may be present at 402. Such code may be provided from another controller or module, for example, an overall engine controller that has determined a failure with the turbocharging system in general when the engine cannot produce a requested power level, or be generated within the controller 216. When the fault is annunciated at 402, the electronic controller (e.g. the controller 216 shown in FIG. 2) can be configured, for example, by a technician, to run a service test at 404 to determine which component has specifically failed. This determination, as described above, may include one or more test steps that activate various components and then monitor sensor parameters to determine where the fault may have occurred.

Once the faulted component has been identified during the service test at 404, for example, by a service technician or by eliminating those failure modes that the controller diagnostics can determine automatically, as described above, the component is serviced at 406. Such service may include human intervention to replace or repair the component, if such intervention is possible, or may alternatively employ automated failure mitigation techniques, such as those described above, whereby the priority of the failed inline turbocharger that includes the component is changed. In the event the failure is of the type where reprioritization will not be effective, e.g., a failed engine harness, then the faulted component is taken out of service until there is a repair opportunity by human intervention. If, however, the healing of the fault is successful automatically, the fault code is cleared at 412 after a service test has been successfully completed, and the engine continues running. If healing is not immediate, the service test is rerun at 408, and the engine returns to normal operation at 410 with the fault code cleared after the service test is successfully completed and indicates that the fault is no longer present.

Figure 5:
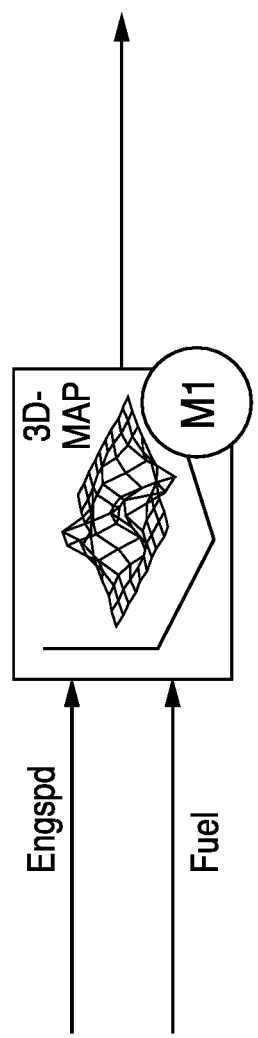
FIG. 5 is a control diagram in accordance with the disclosure.

In those instances where the fault is either not automatically healable, such as the case with a failed engine harness, or a healable fault does not automatically heal, and also if normal engine operation is not readily possible in the presence of the fault, then the controller 216 switches operation from the normal control module 222 to a backup module 224 (FIG. 2), which in the illustrated embodiment can be a redundant controller that is generally identical or a replica of the normal control module 222. A block diagram of an exemplary functionality for the backup module 224 is shown in FIG. 5, where only a basic functionality is illustrated. As can be seen here, signals indicative of engine speed and engine fueling are provided to a lookup table, which decides on the basis of these parameters the operating state of each inline turbocharger. Failure diagnostic and mitigation functions, like in the control module 222, may also be included in the backup module 224.

The controller 216 can employ various conditions for switching operation to the backup module. For example, the switch can happen when more than one digital outputs of the controller 216, for example, in the I/O device 218, have failed, or if the turbine speed sensor 226 has failed. The backup module 224 in the embodiment shown is calibrated using steady state map-based logic to add/remove inline turbochargers based on engine speed and engine load (fueling) operating parameters.

INDUSTRIAL APPLICABILITY

Table 1 provided below illustrates the various operating modes of the engine 100 and the type of signals that the electronic controller will monitor to identify a failure:

TABLE 1

| Failure Mode | Turbine Valve X | Comp. Valve X | Engine Reaction | Detection method |
|---|---|---|---|---|
| 1 | Failed open | Good | Slow response and lower boost pressure; turbine with failed valve may over speed | Compressor inlet pressure should read pressure below barometric after turbo/comp x is commanded closed |
| 2 | Failed closed | Good | Over speed of other seq. turbo during ramp up; Higher exhaust temperature | Compressor inlet pressure will read same as cylinder intake pressure when turbo/comp x is commanded open |
| 3 | Good | Failed open | Engine speed will be limited to naturally aspirated engine limit based on fuel input. | Compressor inlet pressure will measure barometric pressure when turbo/comp x is commanded closed |
| 4 | Good | Failed closed | Lower boost pressure; Higher smoke if running on fewer than desired turbos | Compressor inlet pressure will show no change after turbo/comp x is commanded open |

As can be seen in Table 1, depending on the failure experienced by each of the turbine or compressor air valves (202 or 204, as shown in FIG. 2) at each inline turbocharger 112, the controller can monitor engine parameters (listed under "Engine Reaction" column), and also turbocharger parameters (specifically, compressor inlet pressure as provided from pressure sensors 228 in FIG. 2), to determine which valve has failed, and also in which failed position did the valve fail (open or closed).

While the systems and methods described herein can effectively diagnose a specific failure in inline turbocharger air valves, additional sensor inputs and engine parameters can be used to diagnose similar failures on engines having more than two inline turbochargers. An illustrative listing of the various sensors that can be used, and the detection methodology for an engine having more, for example, up to six inline turbochargers (labelled #1-#6), each of which is connected in parallel circuit arrangement as the first and second inline turbochargers (112, as shown in FIG. 2) across the intake and exhaust systems, but still using a minimum number of sensors, is provided in Table 2 below:

TABLE 2

| Failure Mode | Sensors required | Diagnostics strategy | Notes |
|---|---|---|---|
| Turbo valve stuck close | #1 Turbocharger speed (TS1) #2 Turbocharger speed (TS2) | TS1 and TS2 does not decrease when adding stages #3-#6 | Sensors only on #1 & #2; Cannot differentiate between valve and turbo failure on #3, #4, #5, and #6 but can still detect failure. If TS sensors are used on #3-#6, failure can be pinpointed |
| Turbo valve stuck open | TS1 TS2 | TS1 and TS2 does not increase when reducing stages | Cannot differentiate as to which turbo valve is stages #3-#6 has failed, as stages are deactivated, unless additional sensors are used on #3-#6 |
| Comp valve stuck close | Compressor inlet pressure (CIP) atmospheric pressure (Patm) | (Patm - CIP) > Threshold | Cannot differentiate between filters 3-4, and 5-6 |
| Comp valve stuck open | CIP Intake manifold absolute pressure (IMAP) | \| IMAP - CIP \| < Threshold | |
| Turbocharger failure | TS1 TS2 | Zero turbo speed | Only on #1 & #2 |

As can be seen from the above table, certain typical engine sensors (CIP, IMAP, Patm) can be used, along with some turbocharger-specific sensors, to diagnose failures and also the failure mode in numerous inline turbochargers, each having a turbine air valve and a compressor air valve (total of 12 valves between the 6 turbochargers), and also the failed state of those valves (24 failure states of 12 valves failing open or closed).

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An internal combustion engine, comprising:
   a cylinder case that includes a plurality of cylinders, the plurality of cylinders associated with an intake system and an exhaust system, wherein during operation, each of the plurality of cylinders receives an intake charge from the intake system and expels exhaust gas to the exhaust system;
   an inline turbocharger including a turbine connected directly to the exhaust system and a compressor connected directly to the intake system;
   a first inline turbocharger including:
   a first inline turbine connected to the exhaust system;
   a first turbine air valve disposed to block a flow of exhaust gas from the exhaust system through the first inline turbine;
   a first inline compressor connected to the intake system;
   a first compressor air valve disposed to block a flow of intake charge to the intake system from the first inline compressor; and
   a control valve associated with the first inline turbine and compressor air valves, the control valve being responsive to a first command from an electronic controller to effect a move for each of the first inline turbine and compressor air valves between respective open and closed positions;
   a second inline turbocharger including:
   a second inline turbine connected to the exhaust system;
   a second turbine air valve disposed to block a flow of exhaust gas from the exhaust system through the second inline turbine;
   a second inline compressor connected to the intake system;
   a second compressor air valve disposed to block a flow of intake charge to the intake system from the second inline compressor; and
   a second control valve associated with the second inline turbine and compressor air valves, the second control valve being responsive to a second command from the electronic controller to effect a move for each of the second inline turbine and compressor air valves between respective open and closed positions;
   wherein the electronic controller is programmed and operates to:
   monitor a plurality of operating parameters of the internal combustion engine;
   diagnose a fault in the first inline turbine or compressor air valve;
   determine whether the fault is a stuck open or a stuck closed valve;
   adjust a priority schedule for activating or deactivating the first inline turbocharger based on the determination of whether the fault is a stuck open or a stuck closed valve;
   determine whether the fault has been healed; and
   readjust the priority schedule when the fault has been healed.

2. The internal combustion engine of claim 1, further comprising a plurality of inline turbochargers arranged in parallel circuit connection with the first inline turbocharger, each of the plurality of inline turbochargers having a respective turbine air valve and a respective compressor air valve.

3. The internal combustion engine of claim 1, wherein the plurality of operating parameters includes an inlet pressure of the first inline compressor, which is used to diagnose the fault and whether the first turbine air valve is stuck open or closed, and whether the first compressor air valve is stuck open or closed.

4. The internal combustion engine of claim 1,
wherein the electronic controller is further programmed and operates to:
diagnose the fault in the second inline turbine or the second compressor air valve; and
adjust the priority schedule for activating or deactivating the second inline turbocharger based on the determination of whether the fault is a stuck open or a stuck closed valve.

5. The internal combustion engine of claim 4, wherein the electronic controller is further programmed and operates to adjust the priority schedule such that the first or second inline turbocharger in which the fault is present is re-prioritized to be activated first and deactivated last when the fault indicates that a valve is stuck open.

6. The internal combustion engine of claim 4, wherein the electronic controller is further programmed and operates to adjust the priority schedule such that the first or second inline turbocharger in which the fault is present is re-prioritized to be activated last and deactivated first when the fault indicates that the valve is stuck closed.

7. The internal combustion engine of claim 1, wherein the electronic controller is further programmed and operates to maintain a time of operation for each of the first and second inline turbochargers, and readjust the priority schedule when the fault has been healed such that the first or second inline turbocharger having the lowest time of operation is activated first and deactivated last.

8. The internal combustion engine of claim 7, wherein the electronic controller is further programmed and operates to readjust the priority schedule when the fault has been healed such that the first or second inline turbocharger having the highest time of operation is activated last and deactivated first.

9. A method for operating an engine, comprising:
providing an electronic controller associated with the engine, the electronic controller disposed to receive information from a plurality of sensors disposed on the engine, the engine including first and second inline turbochargers, each having an inline turbine with a turbine air valve, an inline compressor with a compressor air valve, and a control valve that is responsive to a command from the electronic controller to effect a move for each of the turbine and compressor air valves between respective open and closed positions;
wherein the method further comprises:
diagnosing a faulting valve in one of the turbine or compressor valves in the first or second inline turbocharger based on the information received in the electronic controller from the plurality of sensors;
commanding the faulting valve to activate in one direction;
commanding the faulting valve to activate in an other direction;
determining whether the faulting valve has moved and, while the faulting valve has not moved, continuing to command the faulting valve to activate in the one or the other direction by re-prioritizing the first or second inline turbocharger having the faulting valve to operate out of turn.

10. The method of claim 9, further comprising continuing to monitor operation of the faulting valve following each command to activate while the faulting valve has not moved to determine whether the faulting valve resumes normal operation.

11. The method of claim 9, wherein the engine further comprises a plurality of inline turbochargers arranged in parallel circuit connection with the first and second inline turbochargers, each of the plurality of inline turbochargers having a respective turbine air valve and a respective compressor air valve.

12. The method of claim 9, wherein the information from the plurality of sensors includes information indicative of an inlet pressure at an inlet of each of the first and second inline compressors, which information is used to diagnose the faulting valve.

13. The method of claim 9, wherein reprioritizing the first or second inline turbocharger out of turn is accomplished by adjusting a priority schedule used by the electronic controller for activating or deactivating the first and second inline turbochargers.

14. The method of claim 13, wherein the electronic controller operates to adjust the priority schedule such that the first or second inline turbocharger that includes the faulting valve is re-prioritized to be activated first and deactivated last when the faulting valve is stuck open, such that the one direction is an opening direction and the other direction is closing direction.

15. The method of claim 13, wherein the electronic controller operates to adjust the priority schedule such that the first or second inline turbocharger that includes the faulting valve is re-prioritized to be activated last and deactivated first when the faulting valve is stuck closed, such that the one direction is a closing direction and the other direction is an opening direction.

16. The method of claim 13, wherein the electronic controller further operates to maintain a time of operation for each of the first and second inline turbochargers, and readjust the priority schedule when the faulting valve has healed such that the first or second inline turbocharger having the lowest time of operation is activated first and deactivated last, and the first or second inline turbocharger having the highest time of operation is activated last and deactivated first.

17. A diagnostic system for a turbocharger arrangement on an engine, comprising:
a first inline turbocharger including:
a first inline turbine;
a first turbine air valve disposed to block flow through the first inline turbine;
a first inline compressor;
a first compressor air valve disposed to block flow through the first inline compressor; and
a control valve associated with the first inline turbine and compressor air valves, the control valve being responsive to a first command from an electronic controller to move for each of the first inline turbine and compressor air valves between respective open and closed positions;
a second inline turbocharger including:
a second inline turbine connected in parallel to the first inline turbine;

a second turbine air valve disposed to block flow through the second inline turbine;

a second inline compressor connected in parallel to the first inline compressor;

a second compressor air valve disposed to block flow through the second inline compressor; and a second control valve associated with the second inline turbine and compressor air valves, the second control valve being responsive to a second command from the electronic controller to move each of the second inline turbine and compressor air valves between respective open and closed positions;

wherein the electronic controller is programmed and operates to:

monitor a plurality of operating parameters of the engine;

diagnose a fault in the first or second inline turbine or compressor air valve;

determine whether the fault is a stuck open or a stuck closed valve;

adjust a priority schedule for activating or deactivating the first or second inline turbocharger based on the determination of where a faulting valve is located and whether the fault is a stuck open or a stuck closed valve;

determine whether the faulting valve has been healed; and readjust the priority schedule when the faulting valve has been healed.

18. The diagnostic system of claim 17, wherein the electronic controller is further programmed and operates to adjust a priority schedule such that the first or second inline turbocharger in which the faulting valve is present is re-prioritized to be activated first and deactivated last when the faulting valve is stuck open, and to be activated last and deactivated first when the fault indicates that the valve is stuck closed.

19. The diagnostic system of claim 17, wherein the electronic controller is further programmed and operates to maintain a time of operation for each of the first and second inline turbochargers, and readjust the priority schedule when the faulting valve has been healed such that the first or second inline turbocharger having the lowest time of operation is activated first and deactivated last, and the first or second inline turbocharger having the highest time of operation is activated last and deactivated first.

20. The diagnostic system of claim 17, wherein the plurality of operating parameters includes an inlet pressure at each of the first and second inline compressors, which are used to diagnose presence of the faulting valve.

* * * * *